US007265365B2

(12) United States Patent
Arvin et al.

(10) Patent No.: US 7,265,365 B2
(45) Date of Patent: Sep. 4, 2007

(54) APPARATUS FOR CURING A COATING ON A THREE-DIMENSIONAL OBJECT

(75) Inventors: James F. Arvin, Jasper, IN (US); Benjamin W. Hasenour, St. Anthony, IN (US); Peter J. Fritz, Jasper, IN (US); Alan L. Smock, Dubois, IN (US)

(73) Assignee: Dubois Equipment Company, Inc., Jasper, IN (US)

( * ) Notice: Subject to any disclaimer, the term of this patent is extended or adjusted under 35 U.S.C. 154(b) by 318 days.

(21) Appl. No.: 11/136,218

(22) Filed: May 24, 2005

(65) Prior Publication Data

US 2006/0266955 A1 Nov. 30, 2006

(51) Int. Cl.
*B29C 35/08* (2006.01)

(52) U.S. Cl. .............................. 250/492.1; 250/504 R; 250/455.11; 250/493.1; 355/66; 355/67; 126/605

(58) Field of Classification Search ..................... None
See application file for complete search history.

(56) References Cited

U.S. PATENT DOCUMENTS

| | | | |
|---|---|---|---|
| 3,674,974 | A | 7/1972 | Costello |
| 3,679,893 | A | 7/1972 | Shemitz et al. |
| 3,966,308 | A | 6/1976 | Nilson |
| 3,983,039 | A | 9/1976 | Eastland |
| 4,177,383 | A | 12/1979 | Knight |
| 4,208,587 | A | 6/1980 | Eastlund et al. |
| 4,242,725 | A | 12/1980 | Douma |
| 5,113,479 | A | 5/1992 | Anderson et al. |
| 5,151,149 | A | 9/1992 | Swartz |
| 5,167,003 | A | 11/1992 | Montanari et al. |
| 5,300,331 | A | 4/1994 | Schaeffer |
| 5,440,137 | A | 8/1995 | Sowers |
| 5,861,633 | A | 1/1999 | Mandellos |
| 6,312,144 | B1 | 11/2001 | Li |
| 6,387,209 | B1 | 5/2002 | Nettesheim |

(Continued)

OTHER PUBLICATIONS

"Three-Dimensional Ultraviolet Curing of Liquid and Powder Coatings", UV Process Supply, INC.; 2003.

*Primary Examiner*—Jack I. Berman
*Assistant Examiner*—Zia R. Hashmi
(74) *Attorney, Agent, or Firm*—John R. Hoffman

(57) ABSTRACT

An apparatus is provided for curing a curable coating on a three-dimensional object having at least a top surface and a side surface, with the object being advanced along a generally horizontal path. The apparatus includes an elongated light source of radiating curing energy for curing the coating on the surfaces of the object. An open-sided, elongated concave reflector is positioned behind the elongated light source to provide a focus for the radiated curing energy onto the object. The reflector has a generally elliptical cross-section for radiating the curing energy along an energy concentration line generally coincident with the object. The elongated light source is generally at the source focal point of the elongated reflector. The reflector is angled such that a line that runs between the source focal point of the reflector and the energy concentration line extends on the order of 55°-77° from vertical. This angle causes approximately twice as much curing energy and twice the peak intensity to be radiated onto the side surface of the object than onto the top surface of the object.

26 Claims, 6 Drawing Sheets

U.S. PATENT DOCUMENTS

| | | | |
|---|---|---|---|
| 6,601,970 | B2 | 8/2003 | Ueda et al. |
| 6,619,819 | B2 | 9/2003 | Stowell et al. |
| 6,720,566 | B2 | 4/2004 | Blandford |
| 2002/0118541 | A1 | 8/2002 | Stowell et al. |
| 2004/0032034 | A1 | 2/2004 | Bhat |

APPARATUS FOR CURING A COATING ON A THREE-DIMENSIONAL OBJECT

FIELD OF THE INVENTION

This invention relates to an apparatus for curing a curable coating on three-dimensional objects such as contoured cabinet doors or the like.

BACKGROUND OF THE INVENTION

Light energy irradiators have been used for providing intense energy radiation in a wide range of applications. For instance, ultraviolet (UV) irradiators have been used in the curing of polymers such as photopolymer paints, the curing of inks and a variety of finishing coatings, the photo activation of adhesives, varied uses in the graphic arts and other areas in research and manufacturing. Curing is produced by a polymerization reaction initiated by ultraviolet light, changing a component of the coating from a liquid to a solid state almost instantaneously. A UV lamp or other light source can be used in such a manner to be supported adjacent a reflecting surface which is configured to provide a focused reflection of the light. When used for curing, a reflector system may have an elliptical profile reflector surface to provide a focused optical configuration wherein the light energy is concentrated into a narrow band of energy on the curing surface. Typically, because of the speed of curing, elliptical reflectors are used in systems wherein the object having a curable coating, for instance, is carried past the concentrated light band on a conveyor or other advancing conveying means.

One of the problems with curing systems of the character described above is the inability of the system to adequately and/or efficiently cure coatings on three-dimensional objects. For instance, when curing a curable coating or finish on a contoured cabinet door, the door has multiple edges and the face of the door has a variety of flat and/or rounded surfaces to provide an aesthetically pleasing profile when the door is hung and hinged at the front of the cabinet. When the door is conveyed past a curing light source, the door presents top surfaces and a variety of side surfaces. It is quite difficult to consistently cure the coating on the top surfaces with the same peak intensity and total energy in curing the coating on the side surfaces. In other words, the top surfaces typically run horizontally past the light source, but the side surfaces are oriented more vertically if not in absolute vertical orientations. This makes consistent curing extremely difficult because the peak intensity and total energy from the light source is not the same for all surfaces of the three-dimensional object. The present invention is directed to systems and/or apparatus for solving these problems.

SUMMARY OF THE INVENTION

An object, therefore, of the invention is to provide a new and improved apparatus for curing a curable coating on a three-dimensional object having at least a top surface and a side surface. The object typically is advanced in a generally horizontal path.

In the exemplary embodiment of the invention, the apparatus includes an elongated light source of radiating curing energy for curing the coating on the surfaces of the object. An open-sided, elongated concave reflector is positioned behind the elongated light source to provide a focus for the radiated curing energy onto the object. The reflector has a generally elliptical cross-section for radiating the curing energy along an energy concentration line generally coincident with the object. The elongated light source is generally at one of the two focal points of the elliptical reflector. This focal point will be called the source focal point. The emitted light from the source focal point concentrates at the other focal point of the reflector along the energy concentration line. The reflector is angled such that a line that runs between the source focal point of the reflector and the energy concentration line extends on the order of 55°-77° from vertical. This angle causes approximately twice as much curing energy to be radiated on the side surface of the object than onto the top surface of the object, and twice the peak intensity to be radiated on the side surface of the object than onto the top surface of the object. An optimum angle is on the order of 65°.

The invention contemplates the provision of a second elongated light source and a second generally elliptical reflector therebehind and angled approximately 55°-77° from vertical. The second reflector generally faces the first reflector and radiates curing energy from the second light source along an energy concentration line generally coincident with the energy concentration line of the first reflector. Again the optimum angle is approximate 65°.

According to an aspect of the invention, the elongated light sources and elongated reflectors extend at a horizontal angle to the path of advancement of the object. Preferably, the horizontal angle is on the order of approximately 40°.

According to another aspect of the invention, the elongated reflector(s) can be considered the main reflector of the apparatus. This aspect of the invention contemplates the provision of a back reflector behind the elongated light source for redirecting rearwardly radiated curing energy from the light source. Side reflectors are provided on the main reflector for reflecting the redirected curing energy from the back reflector to the energy concentration line. In the preferred embodiment, the back reflector includes a pair of side elliptical sections which redirect the rearwardly radiated curing energy around opposite sides of the light source toward a pair of side reflectors on the main reflector, and the side reflectors are generally elliptical.

Finally, in the preferred embodiment of the invention, the elongated light source(s) comprises a UV light tube or lamp.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
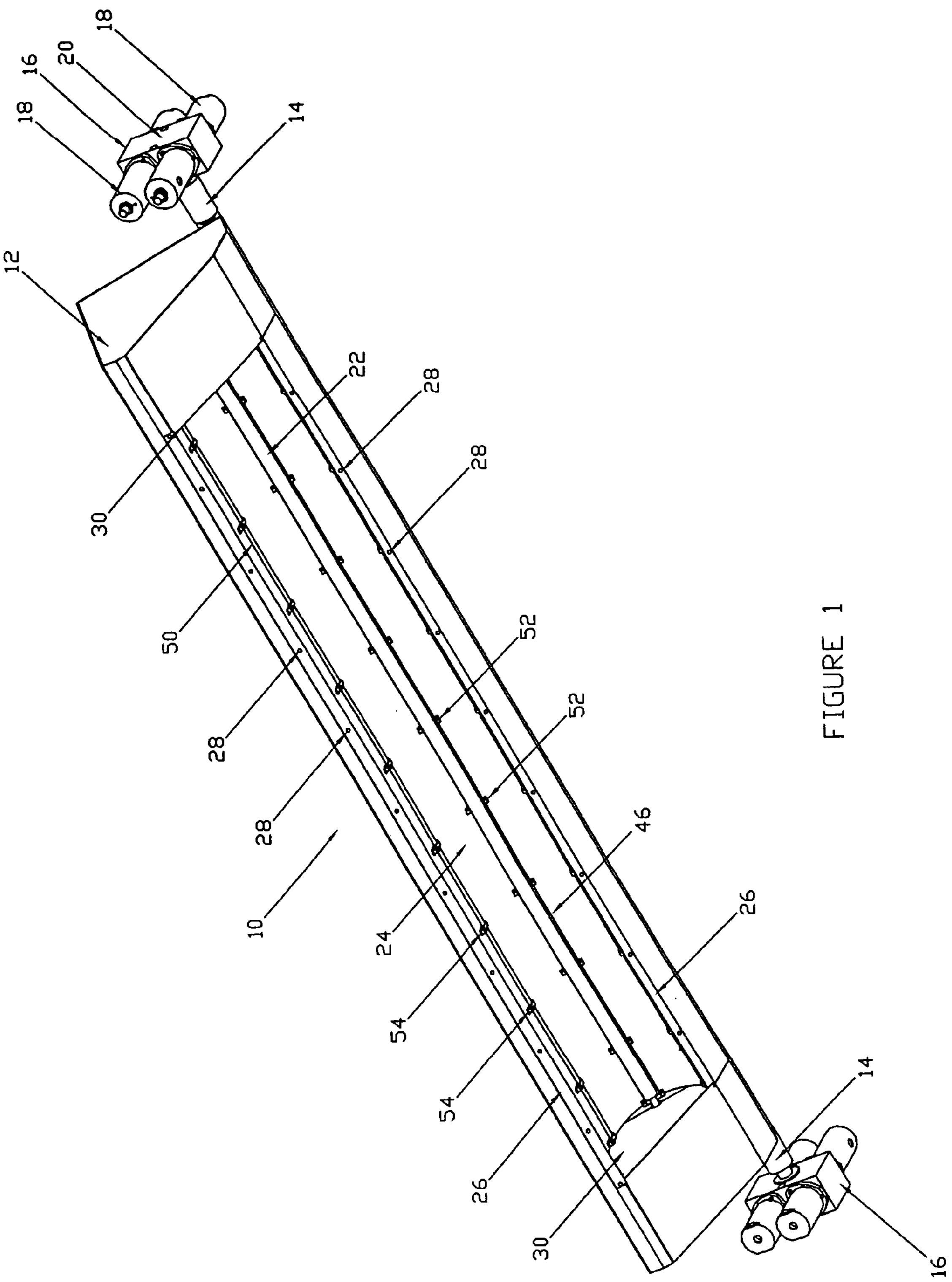
FIG. 1 is a bottom perspective view of a curing lamp assembly according to the invention.
Figure 2:
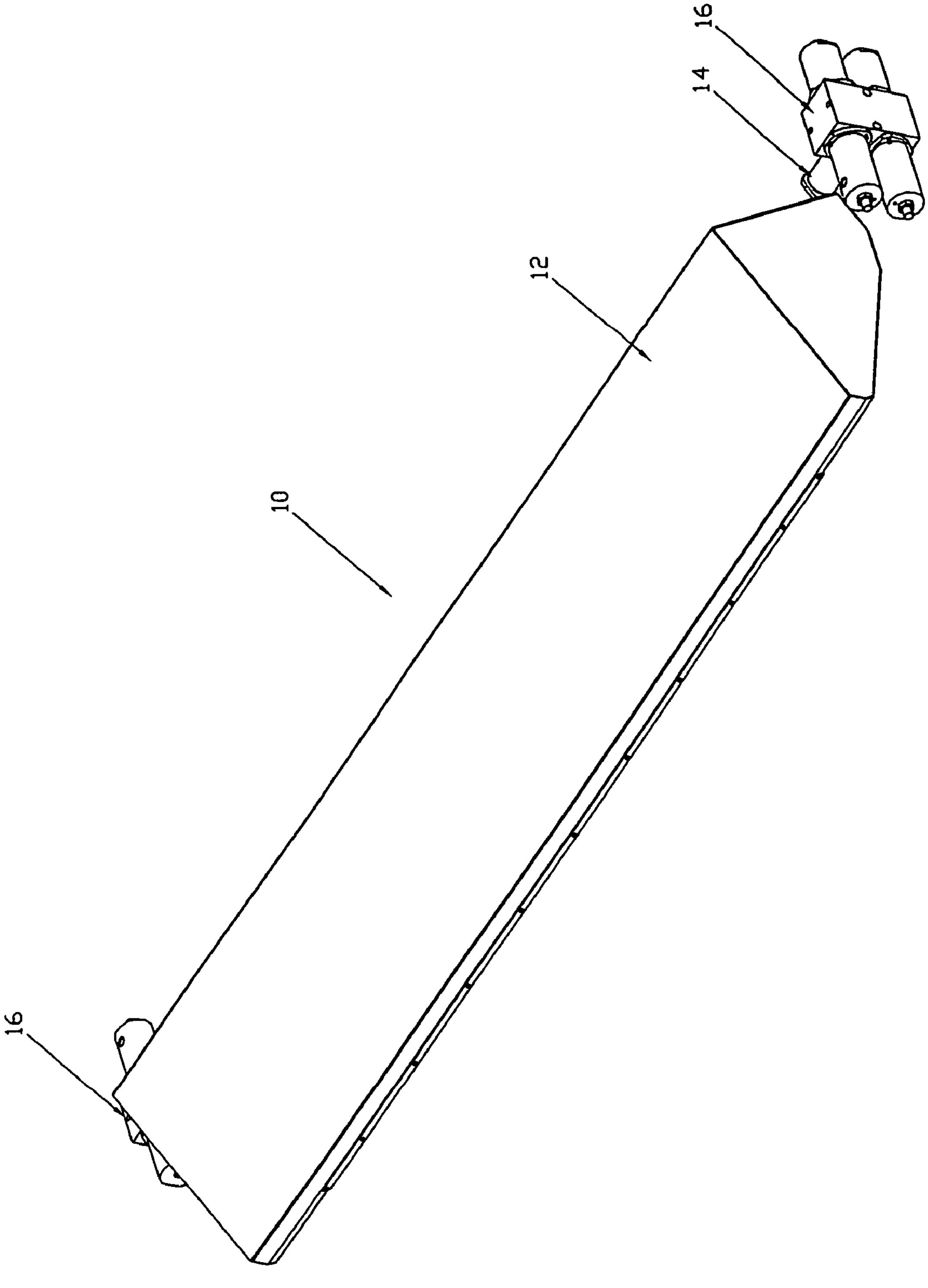
FIG. 2 is a top perspective view of the assembly of FIG. 1.

Referring to the drawings in greater detail, and first to FIGS. 1 and 2, the invention is embodied in at least one curing lamp assembly, generally designated 10, which includes a cover, generally designated 12. The cover is rotatably adjustable about a rotating shaft means 14 which is rotated by a rotary actuator, generally designated 16. The rotary actuator includes a plurality of air cylinders 18 coupled to shaft means 14 through a gear box 20. The rotary actuator is effective to adjustably rotate the angle of cover 12 for purposes which will be apparent hereinafter.

As best seen in FIG. 1, an elongated light source 22 of radiating curing energy is mounted within cover 12. An open-sided, elongated concave reflector, generally designated 24, is mounted behind light source 22 to provide a focus for radiated curing energy onto an object, as will be seen hereinafter. The reflector is mounted within the cover by a pair of mounting strips 26 and a plurality of fasteners 28. A pair of highly reflective end walls 30 are mounted within the cover at opposite ends of light source 22 and reflector 24. In the preferred embodiment, light source 22 is an ultraviolet (UV) light tube or lamp. Reflector 24 is generally elliptical in cross-section for radiating the curing energy along an energy concentration line generally coincident with the object to be cured, again as will be seen hereinafter. It should be understood that the reflective surface of reflector 24 is "generally" elliptical in that a perfectly elliptical surface is not fabricationally practical. In fact, a generally elliptical reflective surface could be fabricated with many finite straight line sections.

Figure 3:
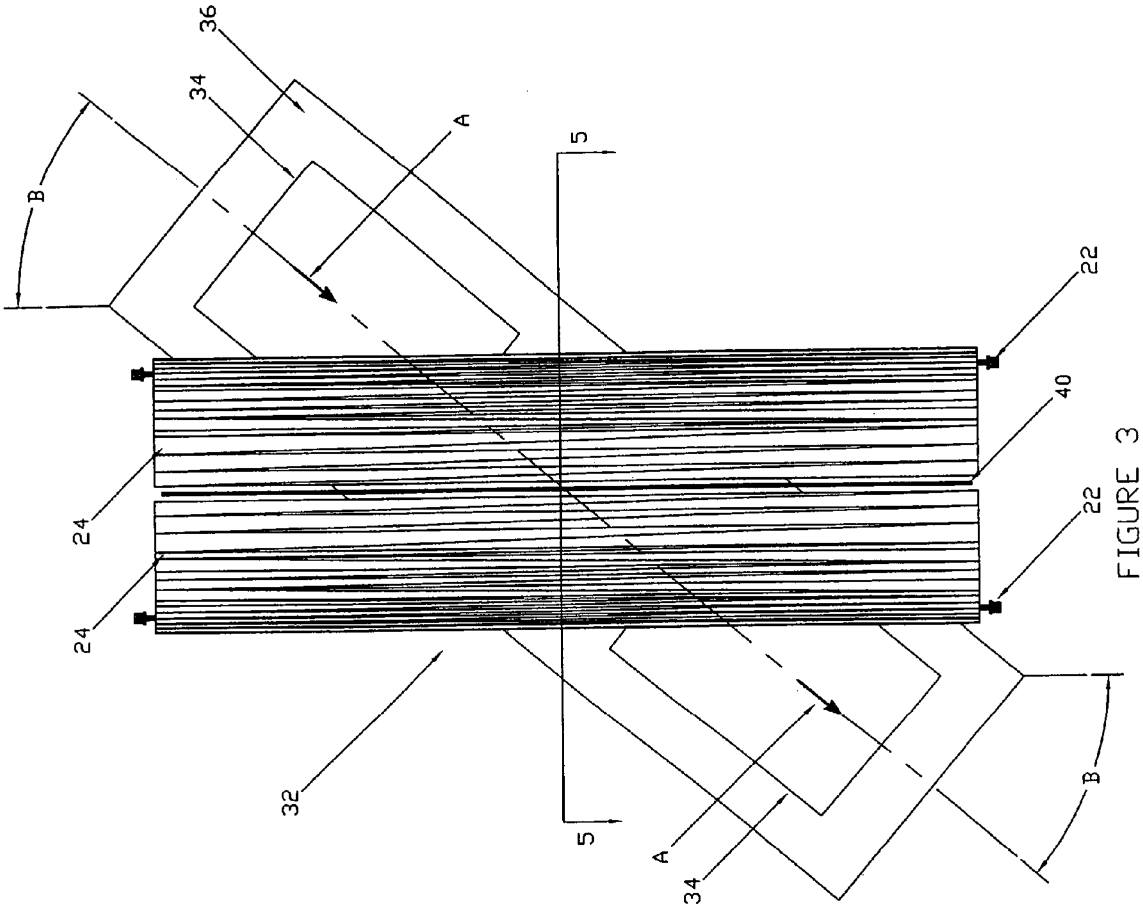
FIG. 3 is a top plan view of a pair of reflectors, isolated from a pair of lamp assemblies, suspended over a conveyor, according to the invention.
Figure 4:
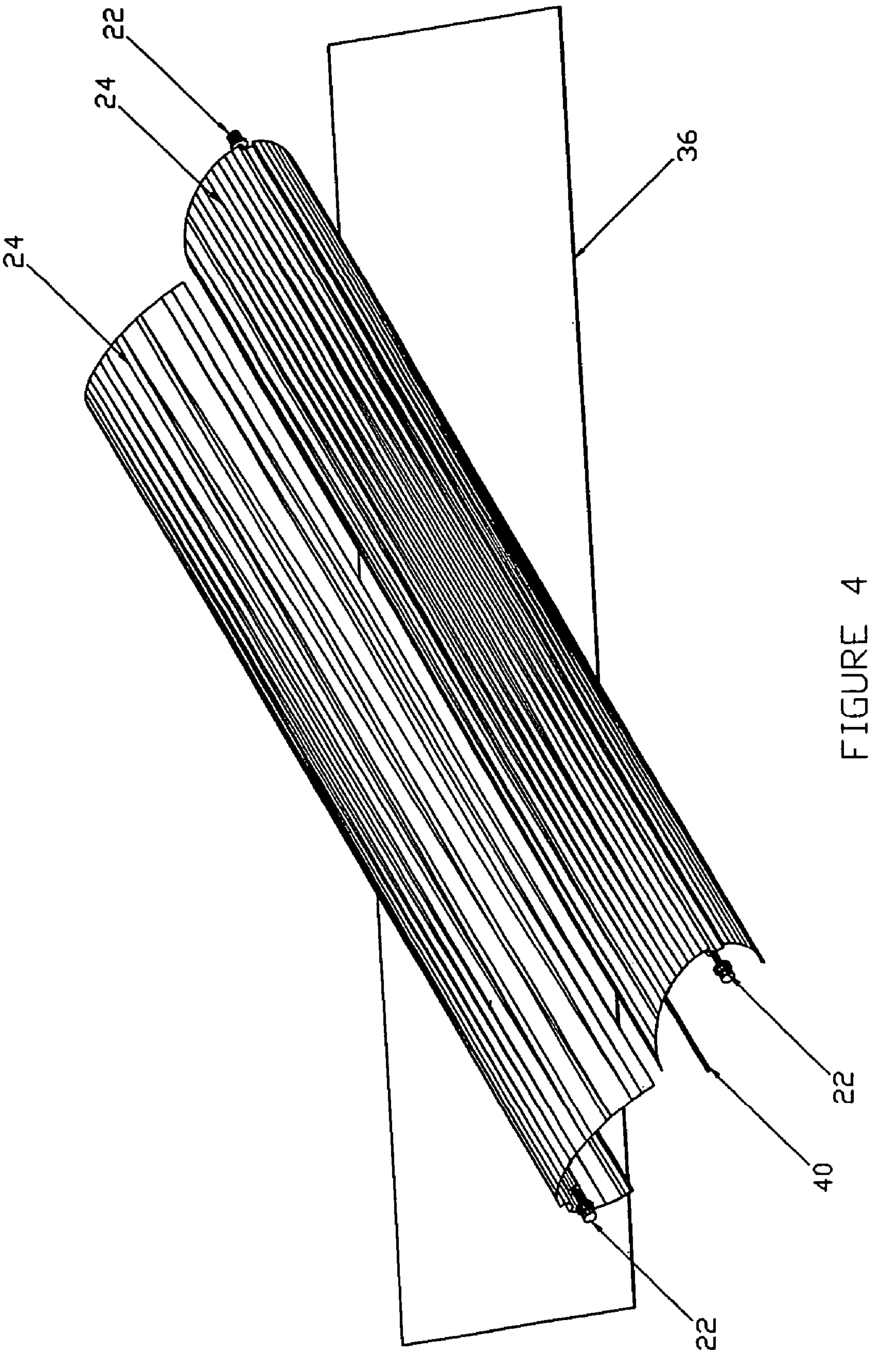
FIG. 4 is a top perspective view of the depiction of FIG. 3.

FIGS. 3 and 4 show a pair of reflectors 24 which have been removed from their respective lamp assemblies 10 (FIGS. 1 and 2) in order to facilitate the illustration of an apparatus, generally designated 32, for curing a curable coating on three-dimensional objects 34 which are advanced by a conveyor 36 along a generally horizontal path indicated by arrows "A". Of course, in actual practice, reflectors 24 would be mounted within covers 12 as described above in relation to FIGS. 1 and 2. Reflectors 24 (and UV lamps 22) are oriented to extend at horizontal angles to the path of advancement of objects 34 as seen clearly in FIG. 3 and indicated by double-headed arrows "B". In the preferred embodiment, horizontal angles "B" are on the order of 40°.

The three-dimensional objects 34 can vary considerably and have a variety of configurations. Apparatus 32 has proven highly effective in curing coatings on three-dimensional cabinet doors which have a wide variety of aesthetically pleasing contours or designs. Suffice it to say, any such objects will have at least a top surface and a side surface, typically multiple top surfaces and side surfaces. In the conveyor system of FIGS. 3 and 4, the top surfaces of the objects would be generally horizontal, and the side surfaces would be generally vertical. Of course, with cabinet doors, some of the side surfaces might be somewhat rounded.

Figure 5:
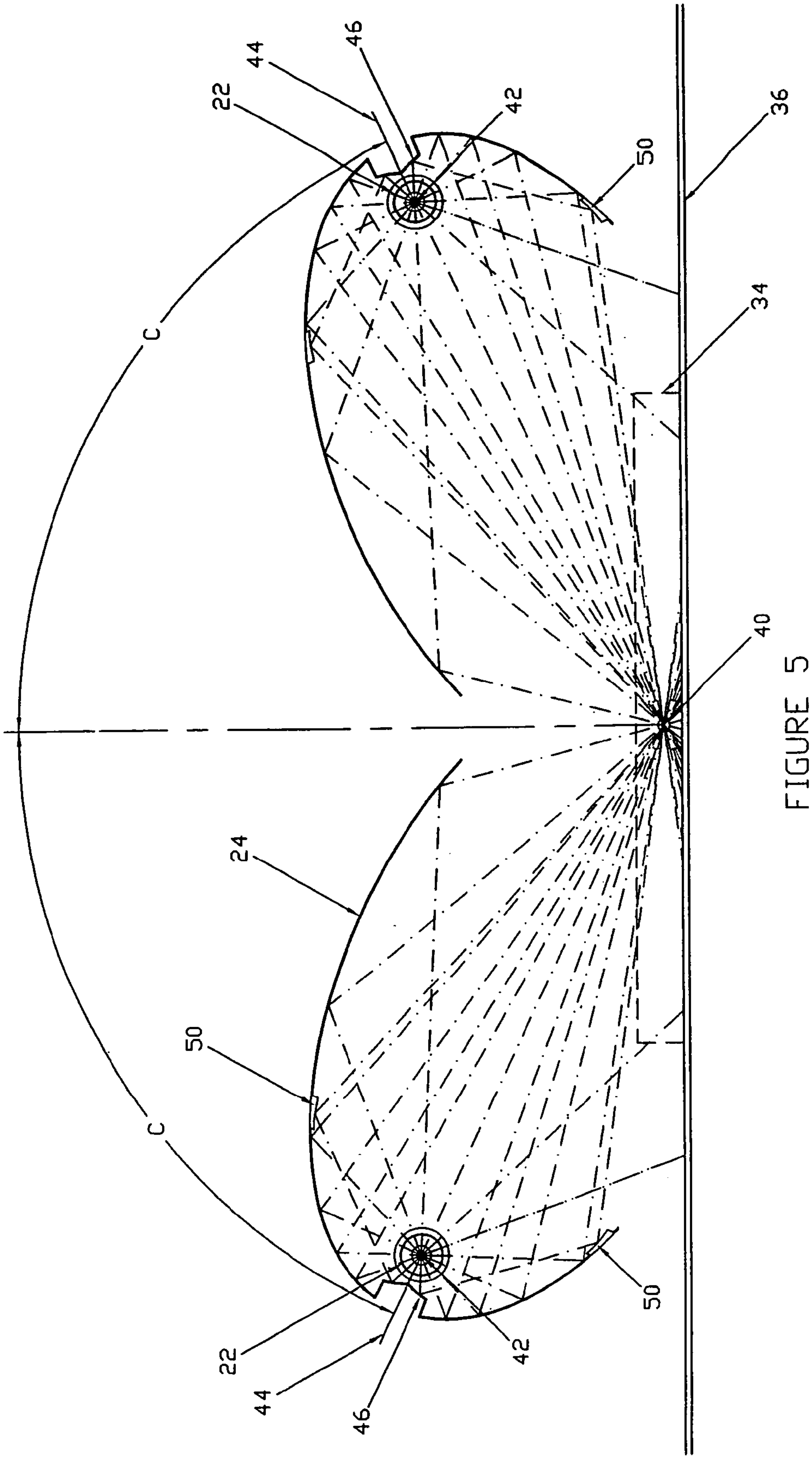
FIG. 5 is a vertical section taken generally along line 5-5 in FIG. 3.

With those understandings, a cross-section of the two reflectors, generally designated 24, is shown in FIG. 5. It can be seen that each reflector has a generally elliptical cross-section for radiating curing energy from the respective light source or UV lamp 22 along an energy concentration line 40 generally coincident with an advancing object 34. The elongated UV lamp is generally at the source focal point 42 of the respective reflector. The reflector is angled such that a line 44 that runs between the source focal point 42 of the reflector and the energy concentration line 40 extends on the order of 55°-77° from vertical, the angles being indicated in FIG. 5 by double-headed arrows "C". An optimum angle is approximately 65°.

When two reflectors 24 (lamp assemblies 10) are used adjacent one another as shown in FIG. 5, the two reflectors generally face each other and radiate curing energy from their respective light sources along a common energy concentration line 40 between the two reflectors. This common energy concentration line is shown by the bold line 40 in FIGS. 3 and 4. Although the spacing between the two reflectors in FIGS. 3-5 is such that the energy concentration lines of the reflectors are coincident at a "common" line, theoretically the reflectors could be spread apart to have two energy concentration lines, as long as the reflectors face one another or direct the radiated curing energy in opposite directions.

It has been found that by orienting each reflector at an angle of approximately 55°-77° from vertical, as shown and described above, approximately twice the amount of dosage or energy and twice the peak intensity of the radiated energy is directed at the side surfaces of an object 34 than is directed at the top surfaces of the object. Then, by employing two opposing reflectors 24, facing in opposite directions and locating their energy concentration lines at the same location on the conveyor or object, the top surfaces of the object will receive another, substantially equal dosage from the second reflector, and the side surfaces of the object which received no dosage from the first reflector receive a full dosage from the second reflector. The dosage summation is that all of the top and side surfaces of the object receive the same dosages of radiated energy and the same peak intensity. All of this is afforded by the unique angular orientations of the reflectors which, individually, radiate twice as much curing energy onto the respective side surfaces of the object than on the top surfaces of the object. The two reflectors combine to radiate the same dosage of curing energy and peak intensity to all surfaces.

Still further, by orienting reflectors 24 at horizontal angles "B" as shown in FIG. 3 and described above, it has been found that the dosage of the curing energy and peak intensity is increased for the edges of object 34 that run parallel to the path of conveyor 36. This preferred horizontal angle is on the order of approximately 40°.

Figure 6:
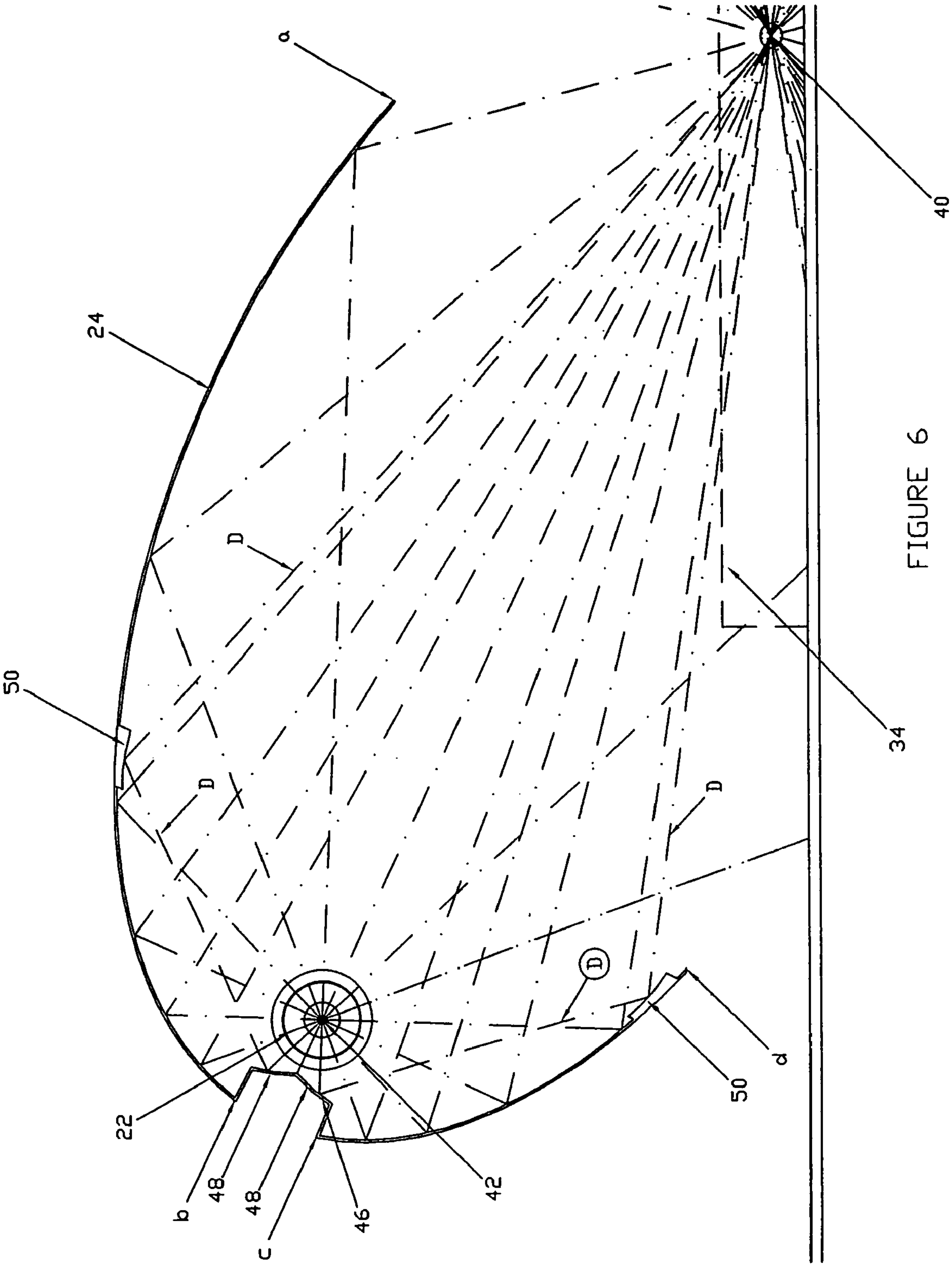
FIG. 6 is an enlargement of the left half of FIG. 5.

Referring to FIG. 6 in conjunction with FIG. 5, the invention contemplates a unique back reflector system which is effective to redirect rearwardly radiated curing energy from the light source or UV lamp 22 around the light source and all the way to the energy concentration line 40. For purposes of this description, reflector 24 will be called the "main" reflector. With that understanding, a back reflector, generally designated 46, is provided behind light source 22. The back reflector includes a pair of side elliptical sections 48. Of course, the back reflector is elongated and runs lengthwise along the elongated light source. A pair of side reflectors 50 are provided on main reflector 24 somewhat forwardly of light source 22 as can be seen in FIGS. 5 and 6. The surfaces of the side reflectors are generally elliptical. As indicated by the dashed reflecting lines "D", back reflector 46, including elliptical sections 48, is effective to redirect the rearwardly radiated curing energy onto side reflectors 50 which, in turn, reflect the energy to energy concentration line 40.

Although, theoretically, the entire main reflector 24 (FIG. 6), along with back reflector 46 and side reflectors 50, could be formed from a single sheet of highly reflective metal material, it has been found efficient to fabricate this composite structure in multiple sections. A first section of the main reflector would run from point "a" to point "b", and a second section of the main reflector would run from point "c" to point "d". Back reflector 46 and side reflectors 50 then would be attached to the sections of the main reflector by securing clips 52 and 54, respectively, as seen in FIG. 1.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

The invention claimed is:

1. An apparatus for curing a curable coating on a three-dimensional object having at least a top surface and a side surface, the object being advanced along a generally horizontal path, comprising:

an elongated light source of radiating curing energy for curing said coating on the surface of the object; and an open-sided, elongated concave reflector behind the elongated light source to provide a focus for the radiated curing energy onto the object, the reflector having a generally elliptical cross-section for radiating the curing energy along an energy concentration line generally coincident with the object, with said elongated light source being generally at the source focal point of the elongated reflector, the reflector being angled such that a line that runs between the source focal point of the reflector and said energy concentration line extends on the order of 55°-77° from vertical, whereby approximately twice as much curing energy is radiated onto the side surface of the object than onto the top surface of the object and twice the peak intensity is radiated onto the side surface of the object than onto the top surface of the object.

2. The apparatus of claim 1 wherein said elongated light source comprises a UV lamp.

3. The apparatus of claim 1 wherein the angle of the reflector is approximately 65° from vertical.

4. The apparatus of claim 1 wherein said elongated light source and elongated reflector extend at a horizontal angle to said path of advancement of the object.

5. The apparatus of claim 4 wherein said horizontal angle is on the order of approximately 40°.

6. The apparatus of claim 1 wherein said elongated reflector comprises the main reflector of the apparatus, and including a back reflector behind the elongated light source for redirecting rearwardly radiated curing energy from the light source, and side reflectors on the main reflector for reflecting the redirected curing energy from the back reflector to said energy concentration line.

7. The apparatus of claim 6 wherein said back reflector includes a pair of side elliptical sections which redirect the rearwardly radiated curing energy around opposite sides of the light source toward a pair of side reflectors on the main reflector.

8. The apparatus of claim 7 wherein said side reflectors are generally elliptical.

9. The apparatus of claim 1, including a second elongated light source and a second elongated generally elliptical reflector therebehind and angled approximately 55°-77° from vertical, the second reflector generally facing the first reflector and radiating curing energy from the second light source along an energy concentration line generally coincident with the energy concentration line of the first reflector.

10. The apparatus of claim 1, including a second elongated light source and a second elongated generally elliptical reflector therebehind and angled approximately 55°-77° from vertical, the second reflector generally facing the first reflector and radiating curing energy from the second light source along an energy concentration line generally coincident with the object.

11. An apparatus for curing a curable coating on a three-dimensional object having at least a top surface and a side surface, the object being advanced along a generally horizontal path, comprising:

an elongated light source of radiating curing energy for curing said coating on the surface of the object;

an open-sided, elongated main reflector behind the elongated light source to provide a focus for the radiated curing energy onto the object, the reflector having a generally elliptical cross-section for radiating the curing energy along an energy concentration line generally coincident with the object, with said elongated light source being generally at the source focal point of the elongated reflector;

a back reflector behind the elongated light source for redirecting rearwardly radiated curing energy from the light source; and side reflectors on the main reflector for reflecting the redirected curing energy from the back reflector to said energy concentration line.

12. The apparatus of claim 11 wherein said back reflector includes a pair of side elliptical sections which redirect the rearwardly radiated curing energy around opposite sides of the light source toward a pair of side reflectors on the main reflector.

13. The apparatus of claim 12 wherein said side reflectors are generally elliptical.

14. An apparatus for curing a curable coating on a three-dimensional object having at least a top surface and a side surface, the object being advanced along a generally horizontal path, comprising:

an elongated light source of radiating curing energy for curing said coating on the surface of the object;

an open-sided, elongated concave reflector behind the elongated light source to provide a focus for the radiated curing energy onto the object, the reflector having a generally elliptical cross-section for radiating the curing energy along an energy concentration line generally coincident with the object, with said elongated light source being generally at the source focal point of the elongated reflector, the reflector being oriented such that a line that runs between the focal point of the reflector and said energy concentration line extends at a first angle from vertical; and said elongated light source and elongated reflector extending at a horizontal, second angle to said path of advancement of the object.

15. The apparatus of claim 14 wherein said second angle is on the order of approximately 40°.

16. The apparatus of claim 15 wherein said first angle is on the order of 55°-77°.

17. The apparatus of claim 16 wherein the angle of the reflector is approximately 65° from vertical.

18. An apparatus for curing a curable coating on a three-dimensional object having at least a top surface and side surfaces, the object being advanced along a generally horizontal path, comprising:

a first elongated light source of radiating curing energy for curing said coating on the surfaces of the object;

an open-sided, elongated first reflector behind the first elongated light source to provide a focus for the radiated curing energy onto the object, the first reflector having a generally elliptical cross-section for radiating the curing energy along a first energy concentration line generally coincident with the object, with said first elongated light source being generally at the source focal point of the first elongated reflector, the first reflector being angled such that a line that runs between the source focal point of the first reflector and said first energy concentration line extends on the order of 55°-77° from vertical, whereby approximately twice as much curing energy is radiated onto some side surfaces of the object than onto the top surface of the object and twice the peak intensity is radiated onto the side surface of the object than onto the top surface of the object;

a second elongated light source of radiating curing energy for curing said coating on the surfaces of the object; and an open-sided, elongated second reflector behind the second elongated light source to provide a focus for the radiated curing energy onto the object, the second reflector having a generally elliptical cross-section for radiating the curing energy along a second energy concentration line generally coincident with the object, with said second elongated light source being generally at the source focal point of the elongated second reflector, the second reflector being angled such that a line that runs between the source focal point of the second reflector and the second energy concentration line extends on the order of 55°-77° from vertical, whereby approximately twice as much curing energy is radiated onto other of the side surfaces of the object than onto the top surface of the object and twice the peak intensity is radiated onto the side surface of the object than onto the top surface of the object, and whereby the two elongated light sources and respective elongated reflectors combine to radiate an equal amount of curing energy and equal peak intensities onto all surfaces of the three-dimensional object.

19. The apparatus of claim 18 wherein said elongated light sources comprise UV lamps.

20. The apparatus of claim 18 wherein said elongated light sources and elongated reflectors are generally parallel and extend at horizontal angles to said path of advancement of the object.

21. The apparatus of claim 20 wherein said horizontal angles are on the order of 40°.

22. The apparatus of claim 18, wherein said elongated reflectors comprise main reflectors of the apparatus, and including back reflectors behind the respective elongated light sources for redirecting rearwardly radiated curing energy from the light sources, and side reflectors on the main reflectors for reflecting the redirected curing energy from the back reflectors to the energy concentration lines.

23. The apparatus of claim 22 wherein each of said back reflectors includes a pair of side elliptical sections which redirect the rearwardly radiated curing energy around opposite sides of the respective light source toward a pair of side reflectors on the respective main reflector.

24. The apparatus of claim 23 wherein said side reflectors are generally elliptical.

25. The apparatus of claim 18 wherein said reflectors are spaced and oriented relative to each other such that said first and second energy concentration lines are coincident.

26. The apparatus of claim 18 wherein the angles of said reflectors are approximately 65° from vertical.

* * * * *